United States Patent [19]

Kubo et al.

[11] Patent Number: 4,817,472
[45] Date of Patent: Apr. 4, 1989

[54] TRANSMISSION CONTROL SYSTEM WITH PROTECTION AGAINST EXCESSIVELY HIGH SPEED DOWNSHIFTING

[75] Inventors: Seitoku Kubo, Toyota; Koujiro Kuramochi, Okazaki; Tatsuo Kyushima, Toyota, all of Japan

[73] Assignee: Toyota Jidosha Kogyo Kabushiki Kaisha, Japan

[21] Appl. No.: 508,989

[22] Filed: Jun. 28, 1983

Related U.S. Application Data

[63] Continuation of Ser. No. 215,659, Dec. 12, 1980.

[30] Foreign Application Priority Data

Apr. 2, 1980 [JP] Japan .................................. 55-43148

[51] Int. Cl.⁴ ............................................ B60K 41/16
[52] U.S. Cl. ......................................... 74/869; 74/867; 74/868
[58] Field of Search .................. 74/869, 868, 867, 865

[56] References Cited

U.S. PATENT DOCUMENTS

| | | | |
|---|---|---|---|
| 3,049,937 | 8/1962 | Lindsay | 74/DIG. 1 |
| 3,886,819 | 6/1975 | Lentz | 74/867 |
| 4,186,627 | 2/1980 | Kuramochi | 74/869 |

FOREIGN PATENT DOCUMENTS 2032025 4/1980 United Kingdom .................. 74/867

Primary Examiner—Allan D. Herrmann
Assistant Examiner—D. Wright
Attorney, Agent, or Firm—Stevens, Davis, Miller & Mosher

[57] ABSTRACT

In an automatic transmission control system incorporating the conventional line, throttle, and governor fluid pressure regulation valves, mannual selector valve, and shift valves such as 1/2, 2/3, and 3/4 shift valves, there is further incorporated a modulator fluid pressure control valve which produces a modulator fluid pressure of a predetermined constant level from the line pressure available from a port of the manual selector valve when it is shifted to a lower range, such as, for example, 2 range. The line fluid pressure regulation valve, which is normally boosted by the throttle pressure, is instead boosted by the modulator fluid pressure when the modulator fluid pressure is present while the throttle fluid pressure is very low as at the time when the manual selector valve has been shifted from the D range to the 2 range for effecting rapid deceleration of the vehicle, so as to support the governor pressure, generated from the line pressure, at a high level while the vehicle speed is still high. A shift valve, which, for example, is the 2/3 shift valve, which is normally shifted by a balanced between the throttle pressure and the governor pressure, is instead shifted by a balance between the modulator fluid pressure and the governor pressure when the modulator pressure is present and the throttle pressure is very low, so that downshifting to 2nd. gear is prevented until the vehicle speed is reduced to a predetermined value. The modulator fluid pressure is supplied to a friction engaging mechanism which provides engine braking in 2nd. gear.

3 Claims, 1 Drawing Sheet

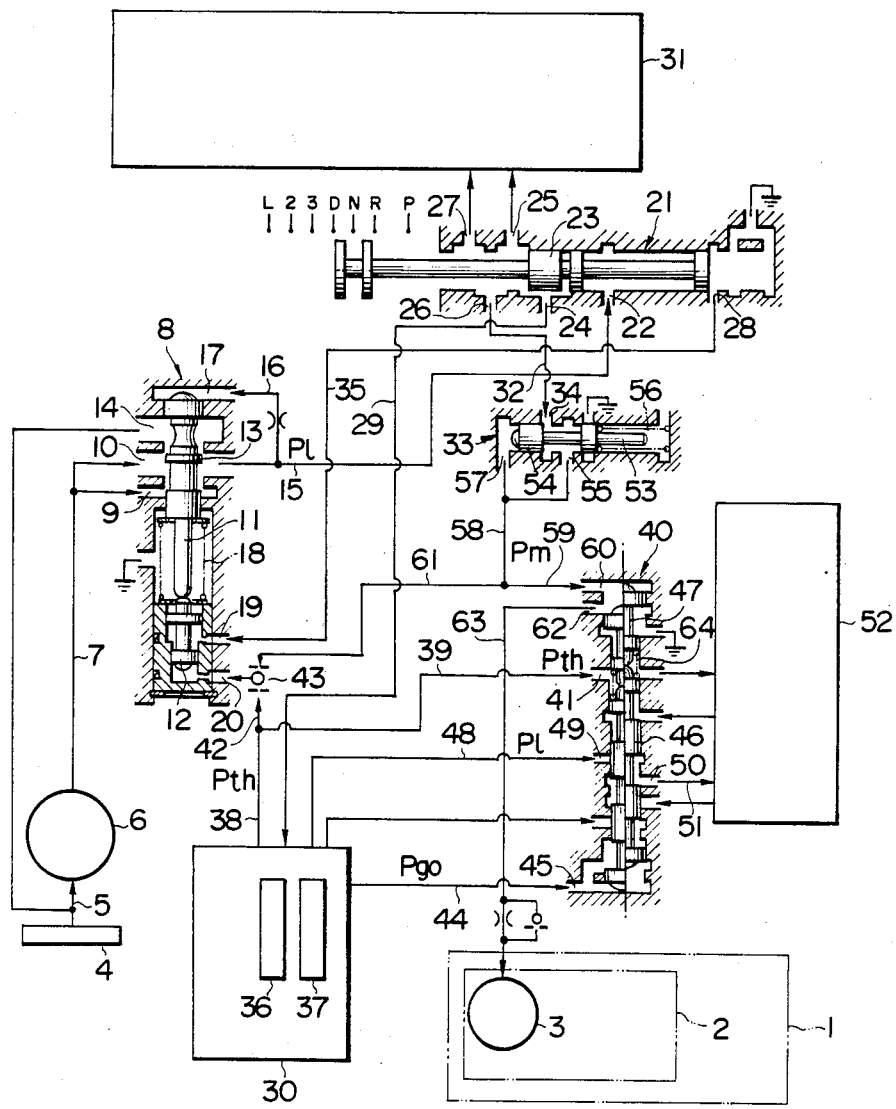

TRANSMISSION CONTROL SYSTEM WITH PROTECTION AGAINST EXCESSIVELY HIGH SPEED DOWNSHIFTING

BACKGROUND OF THE INVENTION

The present invention relates to an automatic transmission for use in a vehicle, and more particularly relates to a hydraulic fluid pressure control system for controlling the engagement of the gear speed stages of such a transmission.

Various automatic transmissions for use in vehicles are well known. Such an automatic transmission generally comprises a gear transmission mechanism which comprises a plurality of friction engaging mechanisms, and one or another of a plurality of gear speed stages is achieved by selectively providing operating fluid pressures to various ones of the friction engaging mechanisms. Further, various hydraulic fluid pressure control systems are well known for controlling said selective supply of operating fluid pressures to the friction engaging mechanisms. Such a hydraulic fluid pressure control system generally comprises: a source of hydraulic fluid pressure such as a pump; a line fluid pressure control valve which modifies the fluid pressure supplied from the fluid pressure source and which produces a line fluid pressure which is regulated to an appropriate line fluid pressure level; a throttle fluid pressure control valve which modifies the line fluid pressure and which produces a throttle fluid pressure which increases in accordance with increase of a parameter representative of the load upon the internal combustion engine of the vehicle—in most cases, in accordance with increase of throttle opening of the engine, which is taken as indicative of engine load; a governor fluid pressure control valve, which modifies the line fluid pressure and which produces a governor fluid pressure which increases in accordance with increase of the road speed of the vehicle; a manual selector valve which is controlled by hand by the driver of the vehicle and which is selectable between a plurality of positions which correspond to desired ranges of gear speed stages, typically including a "D" range and at least one forward range which is not a "D" range; and a plurality of speed shift valves, which selectively shift supply of actuating fluid pressures to the plurality of friction engaging mechanisms, according to various equilibrium relationships between the throttle fluid pressure and the governor fluid pressure, in a per se well known fashion.

Thus, in such an automatic transmission, the desired transmission speed range is manually set by the driver on the aforesaid manual selector valve, and then, within this speed range, the various speed shift valves corresponding to speeds which are allowed to be selected within this speed range are shifted to and fro according to the aforesaid balance relationships between the opposing governor fluid pressure and throttle fluid pressure, in accordance with the operating conditions of the vehicle and of the internal combustion engine of the vehicle, and thus the gear transmission mechanism is set to a particular speed stage.

Further, it is known for the aforesaid level of the line fluid pressure maintained by the line fluid pressure regulation valve to be increased in accordance with increase of the value of the throttle fluid pressure. This is usually done because when the vehicle is being operated at high engine load, i.e. high throttle opening, then the torque produced by the engine is high, and accordingly it is desirable to engage the friction engaging mechanisms of the automatic transmission (which are typically engaged by selectively switched supply of said line fluid pressure) more quickly and more tightly than when the engine is producing low torque. Accordingly, therefore, the value of the line fluid pressure provided by the line fluid pressure regulation valve is increased when the load on the internal combustion engine of the vehicle is high, so that the engagement of the friction engaging mechanisms may be better able to cope with the increased torque at this time.

A problem has arisen with prior art hydraulic fluid pressure control systems for automatic transmissions, in that, when the vehicle comprising the transmission is being driven, for example, at a high road speed with the manual range selection valve of the automatic transmission set to the "D" range, and then the manual range selection valve is manually shifted down by the driver of the vehicle to, for example, the "2" range, with the intention of obtaining strong engine braking for decelerating the vehicle, and when in accordance with this intention the throttle pedal of the vehicle is also released so that the throttle fluid pressure becomes very low or minimum, and thereby also, according to the above described operation, the line fluid pressure becomes minimum, then, although the vehicle's actual road speed still is high, the gear transmission mechanism may be directly shifted down to the second speed stage, and thereby the engine of the vehicle will be rotated at an unduly high rotational speed, i.e., will be over-revved, by the force of the momentum of the vehicle. This happens because, although the speed of the vehicle is still high, because the line fluid pressure has dropped to near minimum due to the aforesaid dropping of the throttle fluid pressure to very low or minimum, the governor fluid pressure control valve, which modifies this line fluid pressure to produce the governor fluid pressure which ought to be representative of the vehicle's road speed, is not able to produce a proper governor fluid pressure accurately representative of the vehicle's road speed, because such a proper governor fluid pressure would be higher than the actual current value of the line fluid pressure, because this line fluid pressure has dropped. Thus, because the governor fluid pressure control valve is of course unable actually to increase the value of the line fluid pressure to produce the governor fluid pressure, accordingly the governor fluid pressure has failed to be maintained at a level properly representing the true road speed of the vehicle. Accordingly, during engine braking, the downshift to, for example, the second speed stage has had a tendency to occur much earlier than it ought to have done.

The most serious possible consequent of this too early downshifting is that the engine of the vehicle is rotated by the momentum of the vehicle at such an excessively high rotational speed that it is seriously damaged. Even if this does not occur, severe shifting shock occurs at the time of this too early downshifting, and this is very uncomfortable for the occupants of the vehicle, and may possibly even cause a serious accident. Further, the durability of the friction engaging mechanisms in the gear transmission mechanism of the automatic transmission is deteriorated, because of the sudden repeated shocks to which they are subjected, and the amount of energy which they are required to absorb.

SUMMARY OF THE INVENTION

Therefore, it is an object of the present invention to tackle the above outlined problem with regard to too early downshifting of a gear transmission mechanism of an automatic gearbox for a vehicle, when the manual range selection valve thereof is manually shifted from a higher to a lower range, and the depression of the accelerator pedal is released so that the throttle fluid pressure drops to minimum or near minimum.

It is a further object of the present invention to provide a hydraulic fluid pressure control system for an automatic transmission for a vehicle, in which engine braking may be available smoothly and reliably, by the operator of the vehicle shifting a manual range selection valve down from a high range to a low range, and releasing the depression of the accelerator pedal so that the throttle pressure drops to minimum or near minimum.

It is a further object of the present invention to provide such a hydraulic fluid pressure control system for an automatic transmission for a vehicle, in which, despite repeated use of engine braking by the driver of the vehicle by shifting a manual range selection valve down from a high range to a low range, and by releasing the depression of the accelerator pedal of the vehicle so that the throttle fluid pressure drops to minimum or near minimum, the durability of the transmission is not adversely affected.

It is a further object of the present invention to provide a hydraulic fluid pressure control system for an automatic transmission, in which a friction engaging mechanism of said automatic transmission, which provides engine braking in a relatively low speed stage, is supplied with a proper actuating fluid pressure, which is not too high therefor.

It is a yet further object of the present invention to provide a hydraulic fluid pressure control system for an automatic transmission, in which downshifting to a low speed stage is positively prevented, above a certain predetermined vehicle road speed.

According to the present invention, these and other objects are accomplished by, for an automatic transmission for an engine driven vehicle, a gear transmission mechanism comprising a plurality of fluid pressure actuated friction engaging mechanisms, selective supply of fluid pressure to said friction engaging mechanisms selectively providing a plurality of speed stages from said gear transmission mechanism: a hydraulic fluid pressure control system, comprising: (a) a source of hydraulic fluid pressure; (b) a line fluid pressure regulation valve, which regulates the fluid pressure from said source of hydraulic fluid pressure to produce a controlled line fluid pressure; (c) a manually operated selector valve, which is selectable between a plurality of positions denoting speed ranges including a "D" range and at least one other forward speed range in which the highest gear speed stage available is lower than the highest gear speed stage available in said "D" range, which receives supply of said line fluid pressure, which produces as output a lower range fluid pressure substantially equal in pressure value to said line fluid pressure when said other forward speed range is selected thereon, and which does not produce as output said lower range fluid pressure when said "D" range is selected thereon; (d) a throttle fluid pressure regulation valve, which receives supply of said line fluid pressure, and which produces therefrom a throttle fluid pressure whose value varies according to a quantity representative of engine load; (e) a governor fluid pressure regulation valve, which receives supply of said line fluid pressure, and which produces therefrom a governor fluid pressure whose value varies according to road speed; (f) a modulator fluid pressure control valve which receives a supply, when available, of said lower range fluid pressure from said manually operated selector valve, and which produces therefrom a modulator fluid pressure by regulating said line fluid pressure to a fixed pressure level; and (g) a shift valve, comprising a valve element, which receives a supply of said throttle fluid pressure which acts on said valve element so as to bias it in a first direction, which further receives supply of said governor fluid pressure which acts on said valve element so as to bias it in a direction opposite to said first direction, and in which said valve element is switched to and fro in said first and opposite directions according to a balance relationship between said throttle fluid pressure and said governor fluid pressure, said shift valve controlling supply of actuating fluid pressure to some of said fluid pressure actuated friction engaging mechanisms so as to provide the highest speed stage available in said other forward speed range when said valve element is in its extremem position in said first direction; (h) said line fluid pressure regulation valve receiving supply of either of said throttle fluid pressure and said modulator fluid pressure, if available, which is higher than the other, as a booster pressure, and providing a value of line fluid pressure increased according to increase in the value of the booster pressure.

By this supplying of the modulator fluid pressure as a booster pressure for increasing the regulated value of the line fluid pressure provided by the line fluid pressure regulation valve, said modulator fluid pressure being only provided when said manual range selection valve is switched to a lower speed range, and by regulating this modulator fluid pressure to a fixed hydraulic fluid pressure level according to the operation of said modulator fluid pressure control valve, thereby the level of the line fluid pressure, at times when the operator of the vehicle is attempting to decelerate said vehicle sharply by engaging a low gear speed range and simultaneously by substantially completely releasing the depression of the accelerator pedal of the vehicle, is maintained at this time at a sufficiently high value which can provide a basic fluid pressure source for the governor fluid pressure control valve to provide a proper governor fluid pressure therefrom which accurately reflects the current high road speed of the vehicle. Further, according to the above described supply of the modulator fluid pressure to the shift valve, to aid the baising action of the throttle fluid pressure on the valve element thereof, it is guaranteed that, even if the throttle pressure is zero or substantially so, according to an equilibrium between the aforesaid constant modulator fluid pressure and the governor fluid pressure, downshifting is not possible above a predetermined vehicle speed, i.e., downshifting at higher vehicle speeds than this predetermined speed is positively prevented.

As a particular aspect of the present invention, it is also proposed that this modulator fluid pressure should be supplied as the actuating fluid pressure for the friction engaging mechanism which is engaged by the downshifting of this shift valve, for providing engine braking. According to this, because the modulator fluid pressure as a matter of course is less than the line fluid pressure, this friction engaging device, which is only engaged during the engaging braking condition, when the torque which it is required to handle is relatively moderate, and which accordingly does not require such a high hydraulic fluid pressure for its actuation as do the friction engaging mechanisms which are used during high engine torque conditions, such as high vehicle acceleration conditions, may be supplied with such a suitable low actuating pressure.

BRIEF DESCRIPTION OF THE DRAWING

The present invention will become more fully understood from the following description of a preferred embodiment thereof, which is to be taken in conjunction with the accompanying drawing. It should be clearly understood, however, that the description of the embodiment, and the drawing, are provided purely for the purposes of illustration and exemplification only, and are in no way to be taken as limitative of the scope of the present invention. The sole FIGURE of the drawing is a part sectional part schematic block diagrammatical illustration of a preferred embodiment of the hydraulic fluid pressure control system for an automatic transmission, according to the present invention. In this FIGURE, the parts of the automatic transmission, and the parts of said preferred embodiment of the hydraulic fluid pressure control system according to the present invention which are per se well known and conventional, are shown as labelled blocks for the purposes of simplicity of explanation, and their internal structures are not further described here, because these structures and functions are per se well known to those skilled in the art.

DESCRIPTION OF THE PREFERRED EMBODIMENT

With reference to the accompanying drawing, the reference numeral 1 denotes a block which represents an automatic gearbox for an automotive vehicle, and this automatic gearbox comprises a gear transmission mechanism 2, which is per se well known and which is therefore also shown in block diagram form. This gear transmission mechanism 2 is so constituted that it can be set to a plurality of gear speed stages: in this embodiment, a first, a second, a third, a fourth, a neutral, and a reverse gear speed stage, according to selective supply of actuating hydraulic fluid pressures to a plurality of friction engaging mechanisms incorporated in said gear transmission mechanism 2, which are of constructions which are per se well known in their structures and functions. One of this plurality of friction engaging mechanisms is shown in block diagram form and is denoted by the reference numeral 3. This friction engaging mechanism 3, as will be explained hereinafter, when a manual range selection valve 21 is switched to its "2" range, is fed a modulator fluid pressure which is regulated to a fixed predetermined value from a line fluid pressure, and, when engaged, enables the gear transmission mechanism 2 to provide engine braking. Because this friction engaging mechanism 3 is engaged during the engine braking condition, for the provision of such engine braking, the torque that it is required to handle is not extremely large, and accordingly it is preferable for said friction engaging mechanism 3 to be operated with a relatively low actuating fluid pressure rather than a high actuating fluid pressure such as the aforesaid line fluid pressure, in order that the engagement of this friction engaging mechanism 3 should not occur too suddenly and thus cause a shift shock in the drive train of the transmission.

The reference numeral 4 denotes a hydraulic fluid reservoir such as an oil pan, and hydraulic fluid which is stored therein is drawn in by a hydraulic fluid pressure pump 6 through a fluid conduit 5 and is compressed. This compressed hydraulic fluid is then fed, through a fluid conduit 7, to two ports 9 and 10 of a line fluid pressure control valve 8. The line fluid pressure control valve 8 comprises a housing within which is formed a bore, and two valve elements 11 and 12 which are axially opposed and which can slide to and from within said housing of said line fluid pressure regulation valve 8, upwards and downwards in the drawing, within said bore. A compression coil spring 18 biases the valve element 11 upwards in the drawing. As the valve element 11 moves upwards and downwards within the bore of the line fluid pressure regulation valve 8, its land portion 13 controls the communication between the aforesaid port 10 and a drain port 14, hdyraulic fluid passing out from said drain port 14 being returned to the hdyraulic fluid reservoir 4. In a per se well known fashion, the valve element 11 is positioned according to an equilibrium relationship between a downwardly acting, in the drawing, force on its upper end, produced by fed back line fluid pressure present at the port 10 of the line fluid pressure regulation valve 8, said fed back line fluid pressure being introduced via a throttling element and a hydraulic fluid conduit 16 to a feed back port 17 at the upper end of the line fluid pressure regulation valve 8, and an upwardly acting, in the drawing, force, which is the sum of a force exerted on said valve element 11 by the coil compression spring 18, and a force exerted on said valve element 11 by the valve element 12, which is located below the valve element 11 in the drawing. According to the balance of these forces, in a per se well known fashion, the pressurized hydraulic fluid supplied from the hydraulic fluid pump 6 to the ports 9 and 10 of the line fluid pressure regulation valve 8 is regulated to a line fluid pressure P1 at the port 10, the value of said line fluid pressure being thus determined by the aforesaid upwardly acting force on the valve element 11 exerted by the valve element 12. The valve element 12 is arranged so as to be driven in the upwards direction in the figure either by a hydraulic fluid pressure supplied to its port 19, when it is present, and by a hydraulic fluid pressure supplied to its port 20. Thus, the value of the line fluid pressure P1 present at the port 10 of the line fluid pressure regulation valve 8 is determined by the position of the valve element 12, which is determined by the values of the pressures supplied to the ports 19 and 20.

The line fluid pressure P1 which is produced at the port 10 of the line fluid pressure regulation valve 8 is fed via the hydraulic fluid conduit 15 to an input port 22 of a manual range selection valve 21. This manual range selection valve 21 is of a kind which is per se conventional and well known to those skilled in the art. The manual range selection valve 21 comprises a housing formed with a bore and a valve element 23 which reciprocates to and fro within said bore, to the left and the right in the drawing. The valve element 23 of the manual range selection valve 21 may be positioned, as shwon in the drawing, to a neutral or "N" position; or, when it is moved to the left in the drawing, to a drive or "D" position, to a 3-range or "3" position, to a 2-range or "2" position, or to a low range or "L" position; or, when it is moved to the right in the drawing, to a reverse or "R" position, or to a parking or "P" position. When the valve element 23 of the manual range selection valve 21 is shifted to the right in the drawing to the "R" position, then the line fluid pressure P1 which is fed to its input port 22 is supplied to its output port 28. From this output port 28 the line fluid pressure P1 is fed via a fluid pressure conduit 35 to the aforesaid port 19 of the line fluid pressure regulation valve 8, where it biases the valve element 12 thereof upwards in the drawing so as substantially to increase the controlled value of the line fluid pressure P1, as explained above. Thus, when the automatic transmission is operated in the reverse or "R" range, the line fluid pressure P1 is boosted. No further discussion will be made of this matter here, because it is not relevant to the essence of the present invention.

On the other hand, if the valve element 23 of the manual range selection valve 21 is shifted to the left in the drawing: when said valve element 23 is shifted to the drive or "D" position, then the line fluid pressure P1 which is supplied to the input port 22 is communicated to the output port 24; when the valve element 23 is shifted to the 3-range or "3" position, then the line fluid pressure P1 fed to the input port 22 is communicated to the output ports 24 and 25; when the valve element 23 is shifted to the 2-range or "2" position, then the line fluid pressure P1 fed to the input port 22 is communicated to the output ports 24, 25, and 26; and, when the valve element 23 of the manual range selection valve 23 is shifted to the low or "L" position, then the line fluid pressure P1 fed to the input port 22 is communicated to all of the output ports 24, 25, 26, and 27.

The line fluid pressure P1 which appears at the port 25 when the valve element 23 of the manual range selection valve 21 is shifted to the "3" position, the "2" position, or the "L" position, and the line fluid pressure P1 which appears at the output port 27 only when the valve element 23 is shifted to the "L" position, are fed to a hydraulic fluid pressure control circuit 31 whose operation is per se well known, and which will not be further discussed here because it is irrelevant to the concept of the present invention. The line fluid pressure P1 which appears at the output port 24 of the manual range selection valve 21 when the valve element 23 thereof is shifted to the "D" position, to the "3" position, to the "2" position, or to the "L" position, i.e. to any forward speed range, is conducted via a hydraulic fluid conduit 29 to a hydraulic fluid pressure control circuit 30 which will be explained hereinafter. The line fluid pressure P1 which appears at the port 26 of the manual range selection valve 21, when the valve element 23 thereof is shifted to the "2" or to the "L" position, is conducted via a hydraulic fluid conduit 32 to a modulator fluid pressure control valve 33, which will be explained in detail hereinafter.

The hydaulic fluid pressure control circuit 30 is per se well known in its structure and function. It is supplied, when the vehicle is in any forward speed range, as explained above, with supply of line fluid pressure P1 through the hydraulic fluid conduit 29, and in particular it comprises a throttle fluid pressure control valve 36 and a governor fluid pressure control valve 37.

The throttle fluid pressure control valve 36 produces a throttle fluid pressure Pth by regulating the line fluid pressure P1 according to the throttle opening of the internal combustion engine of the vehicle incorporating this transmission, said throttle opening being taken as a parameter which is indicative of the load upon said internal combustion engine, and this throttle fluid pressure Pth is fed via a hydraulic fluid conduit 38 and a hydraulic fluid conduit 39 to a port 41 of a 2/3 shift valve 40 which will be explained hereinafter. Further, from the hydraulic fluid conduit 38 there branches off a hydraulic fluid conduit 42 which conducts supply of said throttle fluid pressure Pth to a shuttle valve 43. The output hydraulic fluid conduit of this shuttle valve 43 leads to the port 20 of the line fluid pressure regulation valve 8, and therefore when this throttle hydraulic fluid pressure Pth is conducted via the shuttle valve 43 to the port 20 it causes the controlled value of the line fluid pressure P1 produced by the line fluid pressure regulation valve 8 to be increased according to the value of the throttle fluid pressure Pth. The throttle fluid pressure Pth is so controlled that it increases according to increase of the amount of depression of the throttle pedal of the vehicle. Accordingly, the line fluid pressure P1 is so controlled as to rise in response to increase of the amount of depression of the throttle pedal of the vehicle. This is per set well known in the art and conventional, except for the action of the shuttle valve 43, which will be hereinafter explained.

The governor fluid pressure control valve 37 also in its construction and function is per se well known and conventional. The governor fluid pressure control valve 37 produces from the line fluid pressure P1 a governor fluid pressure Pgo, which varies according to the road speed of the vehicle, Thus, the higher the road speed of the vehicle, the higher is the governor fluid pressure Pgo which is produced by the governor fluid pressure control valve 37; but, of course, the governor fluid pressure control valve 37 is unable to produce an output governor fluid pressure Pgo which is actually higher than the current value of the line fluid pressure P1, and accordingly the governor fluid pressure control valve 37 produces a governor fluid pressure Pgo wich increases according to increase of the road speed of the vehicle, within a range between zero and the current value of the line fluid pressure P1. The governor fluid pressure Pgo produced by this governor fluid pressure control valve 37 is fed through a hydraulic fluid conduit 44 to a port 45 of the 2/3 shift valve 40.

The 2/3 shift valve 40 comprises a housing formed with a bore therein, and coaxially opposed valve elements 46 and 47 which reciprocate to and fro with in said bore, upwards and downwards in the drawing. Between these valve elements 46 and 47, biasing them apart, there is fitted a compression coil spring 64. The downwardly biased positions of the valve elements 46 and 47 are shown on the left hand side of the axis of the 2/3 shift valve 40 in the drawing, and the upwardly biasing positions of these valve elements 46 and 47 are shown on the right hand side of the axis of the 2/3 shift valve 40 in the drawing. Assuming, for the time being, that no hydraulic fluid pressure is supplied to the downshift port 60 of the 2/3 shift valve 40, then by the biasing action of the compression coil spring 64 the valve element 47 is always kept in its upwardly biased position, shown on the right hand side of the axis of the 2/3 shift valve 40 in the drawing. In this condition, therefore, the valve element 46 is shifted between its downwardly biased position, shown on the left hand side of the axis of the 2/3 shift valve 40 in the drawing, and its upwardly biased position, shown on the right hand side of the axis of the 2/3 shift valve 40 in the drawing, according to an equilibrium relationship between an upward force, exerted on the lower end part of the valve element 46 by the governor fluid pressure Pgo supplied to the port 45 of the 2/3 shift valve 40, and a downward force, which is the sum of the downward force exerted by the compression coil spring 64 and a downward force due to the throttle fluid pressure Pth which is being supplied to the input port 41 of the 2/3 shift valve 40. In a per se conventional fashion, according to the upward and downward movement in the drawing of this valve element 46, a supply of line fluid pressure P1 which is supplied via a hydraulic fluid conduit 48 to an input port 49 of the 2/3 shift valve 40 from the hydraulic fluid pressure control circuit 30 is selectively transmitted to an output port 50 thereof, whence via a hydraulic fluid conduit 51 said line fluid pressure P1 is supplied to a hydraulic fluid pressure control circuit 52. In more detail, when the force due to the throttle fluid pressure Pth prevails, and the valve element 46 is in its downwardly biased position, as shown on the left hand side of the axis of the 2/3 shift valve 40, then the supply of line fluid pressure P1 at the input port 49 is not transmitted to the output port 50, and is not supplied to the hydraulic fluid pressure control circuit 52; while, on the other hand, when the governor fluid pressure Pgo prevails, and the valve element 46 is in its upwardly biased position, as shown on the right hand side of axis of the valve 40 in the drawing, then the line fluid pressure P1 supplied to the input port 49 of the 2/3 shift valve 40 is transmitted to the output port 50 thereof, and is supplied, via the hydraulic fluid conduit 51, to the hydraulic fluid pressure control circuit 52, wherein it passes through various conduits, and is supplied therefrom to various friction engaging units for providing the third or the fourth speed stage from the gear transmission mechanism 2, in a per se well known way, when as described above the governor fluid pressure Pgo prevails in the 2/3 shift valve 40 over the throttle fluid pressure Pth.

The hydraulic fluid pressure control circuit 52 is per se well known and conventional, and comprises a 3/4 shift valve, and other valve devices, which control the engagement and disengagement of the higher speed stages of the gear transmission mechanism 2 of the automatic transmission 1. No further discussion will be made of the operation and the functions of this hydraulic fluid pressure control circuit 52, because it is not directly relevent to the gist of the present invention.

The modulator fluid pressure control valve 33 comprises a housing within which is formed a bore, and a valve element 53 which reciprocates to and fro within this bore, to the left and to the right in the figure. The valve element 53 is urged to the left in the figure by a compression coil spring 56, and its land element 54 controls communication between an input port 34 and an output port 55 of the modulator fluid pressure control valve 33. The fluid pressure which appears at the output port 55 is fed back to a feedback port 57 at the left hand end in the drawing of the modulator fluid pressure control valve 33, so as to produce a force which acts upon the left hand end of the valve element 53; and, in a per se well known fashion, by its motion according to an equilibrium relationship between this force due to the fed back pressure appearing at the feedback port 57, and the force due to the compression of the compression coil spring 56, when line fluid pressure P1 is present at the input port 34 of the modulator fluid pressure control valve 33, which, as explained above, is the case when the vehicle is being operated in either the "2" or the "L" range, this line fluid pressure P1 is regulated to a constant pressure value, hereinafter called the modulator fluid pressure Pm. The modulator fluid pressure Pm, which appears at the output port 55 of the modulator fluid pressure control valve 33, is fed to the downshift port 60 of the 2/3 shift valve 40, via a hydraulic fluid conduit 58 and the hydraulic fluid conduit 59, and also, via a hydraulic fluid conduit 61, is supplied to the aforesaid shuttle valve 43, whence if the modulator fluid pressure Pm is greater than the throttle fluid pressure path, said modulator fluid pressure Pm is supplied to the port 20 of the line fluid pressure regulation valve 8, where it acts, as explained above, so as to increase the value of the line fluid pressure P1.

In more detail, the effect of this is as follows. Since the line fluid pressure P1, as regulated by the line fluid pressure regulation valve 8, is boosted by the greater of the throttle fluid pressure Pth supplied through the hydraulic fluid conduits 38 and 42 to the shuttle valve 43 and the modulator fluid pressure Pm supplied through the fluid conduits 58 and 61 to the shuttle valve 43, thereby, even when the manual range selection valve 21 is shifted to the "2" or the "L" range and the modulator fluid pressure Pm is being produced by the modulator fluid pressure control valve 33, if at this time the throttle fluid pressure Pth is high, for example if the vehicle is being accelerated, then it will be this throttle fluid pressure Pth which has an effect of boosting the line fluid pressure P1, because the throttle fluid pressure Pth will overcome the modulator fluid pressure Pm in the shuttle valve 43. On the other hand, if, at the time that the vehicle is in "2" or "L" range, and thus the modulator fluid pressure Pm is being produced by the modulator fluid pressure control valve 33, the throttle fluid pressure Pth is at a low value, such as when the vehicle is being decelerated, in this case it will be the modulator fluid pressure Pm that is used for boosting the value of the line fluid pressure P1 at the input port 20 of the line fluid pressure regulation valve 8, because the modulator fluid pressure Pm will overcome the throttle fluid pressure Pth in the shuttle valve 43. Thus, in this engine braking operation condition, when the manual range selection valve 21 is in the "2" or the "L" range, the line fluid pressure P1 will be maintained at a high level, regardless of the current value of the throttle value Pth at this time, by the biasing action of the modulator fluid pressure Pm.

The modulator fluid pressure Pm is also fed through the hydraulic fluid conduit 59 to the downshift port 60 of the 2/3 shift valve 40. Here, it acts on the upper end of the valve element 47, so as to impel the valve element 47 downwards in the drawing, along with the valve element 46, if the valve element 46 is not already in its downwards position in the drawing. In more detail, if the throttle fluid pressure Pth is low, such as during times of vehicle deceleration when engine braking is required, then the governor fluid pressure Pgo supplied to the port 45 of the 2/3 shift valve 40 is sufficiently strong to compress the compression coil spring between the valve element 46 and 47, and accordingly these valve elements 46 and 47 are moved as a unitary combination between their upwardly biased positions as shown on the right of the axis of the 2/3 shift valve 40 in the drawing, and their downwardly biased positions, as shown on the left of the axis of the 2/3 shift valve 40 in the drawing, on the basis of an equilibrium relationship between the modulator fluid pressure Pm supplied to the downshift port 60, and the governor fluid pressure Pgo supplied to the port 40. If, however, the throttle fluid pressure Pth is relatively high, as during vehicle acceleration when the manual range selection valve 21 is set to the "2" or the "L" range, then this throttle fluid pressure Pth supplied to the port 41 will overcome the effect of the modulator fluid pressure Pm supplied to the downshift port 60, and will bias the valve element 47 upwards in the drawing. However, in the previous abovementioned case, when the throttle fluid pressure Pth is low, as when engine braking is being required, when the contacted combination of the valve elements 46 and 47 is moved to its lower position as shown on the left hand side of the axis of the 2/3 shift valve 40 in the drawing, then in this condition the modulator fluid pressure Pm fed to the downshift port 60 is transmitted to the output port 62 of the 2/3 shift valve 40, whence, via a hydraulic fluid conduit 63 and a throttling means, it is fed to the friction engaging mechanism 3 so as to provide engine braking, when the valve elements 46 and 47 are shifted downward in the drawing and the gear transmission mechanism 2 is shifted down to the second gear stage.

As stated previously, it is preferable that the operating fluid pressure for such a friction engaging mechanism as the friction engaging mechansim 3, the engagement of which is effectively utilized only during the engine braking condition, and which according is not required to transmit a particularly high value of torque, should be lower than the line fluid pressure P1, and this is practiced, according to a particular aspect of the present invention, by supplying the modulator fluid pressure Pm as an operating fluid pressure for this friction engaging mechanism 3.

The operation of this construction will now be explained. First, assume that the automotive vehicle is in the condition of being driven at fairly high speed, with the manual range selection valve 21 set to the "D" range. In this state, the line fluid pressure P1 being supplied to the input port 22 of the manual range selection valve 21 does not appear at the control valve 33 is not producing any modulator fluid pressure Pm. Accordingly, no modulator fluid pressure is being fed to the downshift port 60 of the 2/3 shift valve 40, or to the shuttle valve 43. Because, as stated above, the vehicle speed is relatively high, as a matter of course the governor fluid pressure Pgo fed to the port 45 of the 2/3 shift valve 40 currently is prevailing over the throttle pressure Pth fed to the port 41, and accordingly the valve element 46 of the 2/3 shift valve 40 is in its upwardly biased state, as shown on the right hand side of the axis of said valve 40 in the figure. Also, as a matter of course, the valve element 47 is in its upwardly biased position, because no pressure is present at the downshift port 60 to impel it downwards against the biasing action of the valve element 46 and of the compression coil spring. Further, because the manual range selection valve 21 is in the "D" range, and the vehicle is moving at a high road speed, as a matter of course the abovementioned per se well known 3/4 shift valve, which is comprised in the hydraulic fluid pressure control circuit 52, is switched to its high speed setting, wherein it provides actuating fluid pressure to those of the friction engaging mechanisms with the gear transmission mechanism 2 which provide the fourth gear speed stage from the automatic transmission 1.

Now, suppose that the driver of the vehicle wishes to decelerate sharply, using engine braking, and that with this goal in view he shifts the manual selection valve from the "D" range to the "2" range, bypassing the "3" range. This is a fairly extreme procedure, but it is often practiced when sharp engine braking is required from a vehicle, especially during emergency traffic conditions. As a matter of course, in this condition, the driver releases the throttle pedal of the vehicle, so that the throttle fluid pressure Pth becomes very low almost immediately.

As soon as the manual range selection valve 21 is switched from the "D" range to the "2" range, line fluid pressure P1 appears at its output port 26 and is fed to the input port 34 of the modulator fluid pressure control valve 33. An explained above, this modulator fluid pressure control valve 33 now produces a modulator fluid pressure Pm regulated to a substantially constant value at its output port 55, and this modulator fluid pressure Pm is fed via the hydraulic fluid conduit 58 to the hydraulic fuild conduit 59 which leads to the downshift port 60 of the 2/3 shift valve, and also to the hydraulic fluid conduit 61 which leads to the shuttle valve 43. Because, as explained above, the accelerator pedal of the vehicle has been released at this time, and therefore the throttle fluid pressure Pth which is being fed through the hydraulic fluid conduits 38 and 42 to the shuttle valve 43 is at this time very low, the modulator fluid pressure Pm overcomes the throttle fluid pressure Pth in the shuttle valve 43, and is directed to the port 20 of the line fluid pressure regulation valve 8, and, as explained above, boosts the line fluid pressure P1 by increasing it. Thus, the line fluid pressure P1 is raised by a predetermined amount, corresponding to the predetermined constant value of the modulator fluid pressure Pm, substantially as soon as the manual range selection valve 21 is shifted to the "2" range by the driver of the vehicle.

Further, the modulator fluid pressure Pm fed to the downshift port 60 of the 2/3 shift valve 40 urges the contacted combination of the valve elements 46 and 47 downwards in the figure, against the force exerted on this combination upwards in the figure by the effect of the governor fluid pressure Pgo fed to the port 45 of the 2/3 shift valve 40. Now, according to a balance relationship between the aforesaid effect of the modulator fluid pressure Pm supplied to the downshift port 60 and the governor fluid pressure Pgo supplied to the port 45, at first, when the vehicle speed is high, and accordingly the governor fluid pressure Pgo is relatively high, the contacted combination of the valve elements 46 and 47 will remain in its upwardly biased position as shown on the right hand side of the axis of the 2/3 shift valve 40 in the figure; but, when the vehicle speed has dropped to a certain predetermined speed at which the upward acting effect of the governor fluid pressure Pgo acting on the lower end of the valve element 46 is insufficient to withstand the downward acting effect of the modulator fluid pressure Pm acting on the upper end of the valve element 47, then the contacted combination of the valve elements 46 and 47 is shifted to its downwardly biased position, as indicated on the left hand side of the axis of the 2/3 shift valve 40 in the drawing, and when this occurs the modulator fluid pressure Pm fed to the input port 60 is communicated to the output port 62 of the 2/3 shift valve 40, whence via a hydraulic fluid conduit 63 it is conducted to the aforementioned friction engaging mechanism 3, which thereupon engages so as to provide engine braking in the second gear speed stage. Concurrently with this, by the movement of the valve element 46 from its upwardly biased position in the drawing to its downwardly biased position, the gear transmission mechanism 2 is shifted down into the second speed stage from the third speed stage; it will be a matter of course that before this stage in the slowing down of the vehicle has been reached, the aforementioned per se well known 3/4 shift valve incorporated in the hydraulic fluid pressure control circuit 52 will have shifted the gear transmission mechanism 2 down from the fourth speed stage to the third speed stage.

When the manual range selection valve 21 is first shifted to the "2" range, and thereby the modulator fluid pressure Pm starts to be produced and to be supplied to the downshift port 60 of the 2/3 shift valve 40, as stated above, because the throttle pedal of the vehicle is as a matter of course released at this time, the throttle fluid pressure Pth becomes small. Now, because the throttle fluid pressure Pth has a function of boosting the regulated value of the line fluid pressure P1 as controlled by the line fluid pressure regulation valve 8, since when the depression of the accelerator pedal of the vehicle is suddenly released this throttle fluid pressure Pth diminishes to substantially zero, there is a danger that the line fluid pressure P1 at this time should drop so far that it drops below the proper level of the governor fluid pressure Pgo which ought to be provided by the governor fluid pressure control valve 37 so as to be supplied to the port 45 at the lower end of the valve element 45 of the 2/3 shift valve 40, in order properly to represent the current road speed of the vehicle. If this were to happen, the insufficient governor fluid pressure Pgo supplied to the lower end of the valve element 46 would not be able to resist the effect of the modulator fluid pressure Pm supplied to the upper end of the valve element 47 of the 2/3 shift valve 40, at the time that the modulator fluid pressure Pm was first produced, i.e. shortly after the start of deceleration when the manual range selection valve 21 is shifted to the "2" range; and accordingly there would be a danger that the modulator fluid pressure Pm supplied to the port 60 of the 2/3 shift valve 40 should undesirably prevail at this time over the weakened governor fluid pressure Pgo and thus should force the contacted combination of the valve elements 46 and 47 to their downwardly biased positions as shown on the left hand side of the axis of the 2/3 shift valve 40 in the figure, even though at this time the vehicle speed was rather high. This could severely damage the friction engaging mechanisms of the gear transmission mechanism 2 of the automatic transmission 1. Further, it would create a severe torque shock, and might even cause a serious accident. However, because as in the present invention the modulator fluid pressure Pm is supplied via the hydraulic fluid conduit 61 and the shuttle valve 43 so as also to have a function of boosting the regulated value of the line fluid pressure P1 provided by the line fluid pressure regulation valve 8, similar to the boosting function of the throttle fluid pressure path supplied through the hydraulic fluid conduits 38 and 42, thereby it is ensured that, when the accelerator pedal of the vehicle is suddenly released so as to make the throttle fluid pressure Pth very low, and the manual range selection valve 21 is shifted into the "2" range, thus producing the modulator fluid pressure Pm, at this time the line fluid pressure P1 is maintained at a desirably high level, so as to be able to cope with the demands that the governor fluid pressure regulation valve 37 makes upon it in order to provide a governor fluid pressure Pgo which truly reflects the current high road speed of the vehicle, and which accordingly can withstand the initial application of the modulator fluid pressure Pm supplied to the downshift port 60 of the 2/3 shift valve 4.

Thus, it is seen that according to the present invention, even if in the above described conditions the manual range selection valve 21 is suddenly shifted down and the depression of the accelerator pedal of the vehicle is suddenly released, sudden shifting down of the automatic transmission to the second gear stage is prevented from occurring, because the modulator fluid pressure Pm produced by the modulator fluid pressure control valve 33 is used for boosting the regulated value of the line fluid pressure P1. This ensures that the 2/3 shift valve 40 only performs downshifting to the second gear stage when the vehicle speed has dropped to an appropriate speed value, at which the downshifting to the second speed stage ought to take place from a viewpoint of providing good engine braking, without over revving of the engine, and without putting undue stress upon the friction engaging mechanisms of the automatic transmission.

Because it is the modulator fluid pressure Pm which is fed as an actuating fluid pressure to the friction engaging mechanism 3 which is engaged during engine braking in the second speed stage, since this modulator fluid pressure Pm is substantially lower than the line fluid pressure P1, the engagement of the friction engaging mechanism 3 is desirably not too sudden, as opposed to what it would be if said friction engaging mechanism 3 were actuated by the full value of the line fluid pressure P1. Accordingly, transmission shift shock and undue strain upon the friction engaging mechanism 3 are prevented.

Various variations to the form and the detail of the shown embodiment are possible, in other embodiments. For example, the present invention need not only be applied to the sudden shifting down of the manual range selection valve from the "D" range to the "2" ranges, but could be applied to other combinations of ranges. Accordingly, although the present invention has been shown and described in terms of a preferred embodiment thereof, and in language more or less specific with regard to structural features thereof, and with the illustrative drawing, it should be understood that in any particular embodiment of the present invention various changes, modifications, and omissions of the form and the detail thereof could be made by a person skilled in the art, without departing from the essential scope of the invention. Therefore, it is expressly desired that the scope of the present invention should be uniquely delimited by the legitimate and valid scope of the appended claims, which follow, and not by any of the perhaps purely fortuitous details of the shown embodiment, or of the drawing.

We claim:

1. For an automatic transmission for an engine driven vehicle, comprising a gear transmission mechanism comprising a plurality of fluid pressure actuated friction engaging mechanisms, selective supply of fluid pressure to said friction engaging mechanisms selectively providing a plurality of speed stages from said gear transmission mechanism:

a hydraulic fluid pressure control system, comprising:
   (a) a source of hydraulic fluid pressure;
   (b) a line fluid pressure regulation valve, which is supplied with the fluid pressure from said source of hydraulic fluid pressure and a booster pressure to produce a controlled line fluid pressure which increases as said booster pressure increases;

(c) a manually operated selector valve, which is selectable between a plurality of positions denoting speed ranges including a "D" range and at least one other forward speed range in which the highest gear speed stage available is lower than the highest gear speed stage available in said "D" range, which receives a supply of said line fluid pressure, which produces as output a lower range fluid pressure substantially equal in pressure value to said line fluid pressure when said other forward speed range is selected thereon, and which does not produce as output said lower range fluid pressure when said "D" range is selected thereon;

(d) a throttle fluid pressure control valve, which receives a supply of said line fluid pressure, and which produces therefrom a throttle fluid pressure whose value varies according to a quantity representative of engine load;

(e) a governor fluid pressure control valve, which receives a supply of said line fluid pressure, and which produces therefrom a governor fluid pressure whose value varies according to road speed;

(f) a modulator fluid pressure control valve which receives a supply, when available, of said lower range fluid pressure from said manually operated selector valve, and which produces therefrom a modulator fluid pressure by regulating said line fluid pressure to a fixed pressure level; and (g) a shift valve, comprising a valve element, which receives supply of said throttle fluid pressure and said modulator fluid pressure, if available, which act on said valve element so as to bias it in a first direction, which further receives supply of said governor fluid pressure which acts on said valve element so as to bias it in a direction opposite to said first direction, and in which said valve element is switched to and fro in said first and opposite directions according to a balance relationship between said throttle fluid pressure and said governor fluid pressure, said shift valve controlling supply of actuating fluid pressure to some of said fluid pressure actuated friction engaging mechanisms so as to provide the highest speed stage available in said other forward speed range when said valve element is in its extreme position in said first direction;

(h) a shuttle valve which supplies either of said throttle fluid pressure and said modulator fluid pressure, if available, whichever is higher than the other, as said booster pressure to said line fluid pressure regulation valve.

2. A hydraulic fluid prssure control system according to claim 1, wherein said valve element of said shift valve is switched to and fro according to said balance relationship between said throttle fluid pressure and said governor fluid pressure, only when said throttle fluid pressure is higher than a predetermined level; and otherwise said valve element of said shift valve is switched to and fro in said directions according to another balance relationship between said modulating fluid pressure, if present, and said governor fluid pressure; whereby downshifting to said highest speed stage available in said other forward speed range is positively prevented above a certain predetermined road speed corresponding to said fixed pressure level of said modulator fluid pressure.

3. A hydraulic fluid pressure control system according to claim 1, wherein said shift valve further provides supply of said modulator fluid pressure to a one of said friction engaging mechanisms which provides engine braking in said highest speed stage available in said other forward speed range when said valve element is in its extreme position in said first direction.

* * * * *